(12) United States Patent
Mérant

(10) Patent No.: US 6,854,254 B2
(45) Date of Patent: Feb. 15, 2005

(54) HARVESTING DEVICE WITH DISENGAGABLE SHAKER MEMBERS FOR A FRUIT HARVESTING MACHINE

(75) Inventor: Jean Camille Mérant, La Chapelle-Hermier (FR)

(73) Assignee: CNH France S.A., Racine, WI (US)

( * ) Notice: Subject to any disclaimer, the term of this patent is extended or adjusted under 35 U.S.C. 154(b) by 24 days.

(21) Appl. No.: 10/363,584

(22) PCT Filed: Apr. 9, 2001

(86) PCT No.: PCT/EP01/10248

§ 371 (c)(1),
(2), (4) Date: Oct. 17, 2003

(87) PCT Pub. No.: WO02/19794

PCT Pub. Date: Mar. 14, 2002

(65) Prior Publication Data

US 2004/0050030 A1  Mar. 18, 2004

(30) Foreign Application Priority Data

Sep. 5, 2000   (FR) ........................... 00 11288

(51) Int. Cl.$^7$ .............................................. A01D 46/00
(52) U.S. Cl. ........................................ 56/330; 56/340.1
(58) Field of Search ............................. 56/340.1, 330, 56/328.1, 327.1

(56) References Cited

U.S. PATENT DOCUMENTS 3,727,388 A * 4/1973 Smith ......................... 56/330
4,769,979 A * 9/1988 Merant ........................ 56/330
4,771,594 A * 9/1988 Deux et al. .................. 56/330
4,924,666 A * 5/1990 Poncet ........................ 56/330
5,642,610 A * 7/1997 Dupon et al. ............... 56/340.1
6,155,036 A * 12/2000 Pellenc ....................... 56/328.1

FOREIGN PATENT DOCUMENTS

| FR | 2179699 | 11/1973 |
|---|---|---|
| FR | 2310078 | 3/1977 |
| FR | 2554671 | 5/1985 |
| FR | 2589315 | 5/1987 |
| FR | 2605487 | 9/1988 |
| FR | 2645701 | 10/1990 |
| FR | 2664465 | 1/1992 |

* cited by examiner

Primary Examiner—Árpád Fábián Kovács
(74) Attorney, Agent, or Firm—Rebecca Henkel; Brant T. Maurer

(57) ABSTRACT

A harvesting device, in particular for fruit harvesting machines, which includes a straddling chassis, two shaker assemblies mounted face-to-face on the chassis to shake the fruit trees or bushes and detach the fruits, berries or the like from them. Each shaker assembly includes a drive mechanism having a vertical shaft oscillating about a vertical axis, and a plurality of vertically spaced, horizontal extending flexible rods. Each rod includes a first end detachably coupled to the drive mechanism, a median part and a second end connected to the chassis. The first end of each rod is mounted on the vertical shaft so that it can rotate relative to the vertical shaft and is coupled to the drive mechanism.

22 Claims, 10 Drawing Sheets

HARVESTING DEVICE WITH DISENGAGABLE SHAKER MEMBERS FOR A FRUIT HARVESTING MACHINE

FIELD OF INVENTION

The present invention relates to a harvesting device for a machine for harvesting fruits, berries and the like carried by fruit trees and bushes planted in rows, of the type including a straddling chassis and two sets of shaker members mounted face-to-face on the chassis that co-operate to shake the fruit trees or bushes passing between the two sets to detach the fruits, berries or the like therefrom. In particular it relates to a system for driving the shaker members.

BACKGROUND OF THE INVENTION

The invention concerns in particular, although not exclusively, grape harvesting machines, and will be described more particularly in connection with this type of harvesting, although a machine including the harvesting device according to the invention can equally be used to harvest other fruits and berries, for example blackcurrants, gooseberries or raspberries, or olives or coffee beans.

The principle of harvesting grapes is practically the same in most modern harvesting machines. It is a question of shaking the vine by imparting to it a sinusoidal or pseudo-sinusoidal movement of a certain amplitude and frequency adapted to detach the grapes or the bunches of grapes. This movement is communicated to the whole of the vine by shaker members disposed to operate either on the stocks or the stems of the vines or on the vegetation, i.e. on the fruit-bearing area of the vine, depending on the type and number of shaker members used. The percentage of the bunches of grapes and/or grapes that are detached from the vine depends on the number and the amplitude of the oscillations to which a given bunch of grapes is subjected. The more vigorously a given bunch of grapes is shaken, and the greater the number of times it is shaken, the greater the chance of said bunch or its individual grapes being detached from the vine. The number and the amplitude of the oscillations to which a given bunch of grapes is subjected depend on various parameters for which suitable values can be selected, in particular the amplitude and the frequency of the output of the drive mechanism associated with the shaker members, the length of the active area of said shaker members, their stiffness or flexibility, and the rate at which the machine moves forward, and on other factors that are imposed by the vine itself, in particular how it is trained, its shape and the resistance that it opposes to the movement of the shaker members.

In particular, the number of shaker members and the height of each of them must be adjustable to match them to the height of the vines to be harvested. Thus, for low-growing vines, two or three pairs of shaker members appropriately distributed over the height of the vine are used, for example, whereas for tall vines five or six pairs of shaker members suitably distributed over the height of the vine are used, for example. As the vines planted in adjacent lots or in adjacent rows of vines in the same lot sometimes have different heights from one lot to the other or from one row of vines to the other, the user of the harvesting machine may be obliged to modify the number of shaker members and/or to adjust their height several times a day, before starting to harvest the next lot or the next row of vines. It is therefore desirable for it to be possible to adapt the shaker members to suit the vines to be harvested conveniently and quickly.

In some prior art harvesting machines including a harvesting device of the type defined above (see FR-A-2 605 487, for example), the drive means for each shaker assembly include an oscillating vertical plate which is rigidly connected to the corresponding oscillating vertical shaft and to which the first end of each shaker member, which is in the form of an arcuate rod, is detachably attached. To this end, each oscillating vertical plate is provided with a series of pairs of holes, the pairs of holes being spaced vertically and the two holes of each pair being spaced horizontally. The first end (usually the front end) of each shaker member, which is in the form of an arcuate rod, includes two holes having a spacing corresponding to that of a pair of holes in the corresponding oscillating vertical plate and is coupled to the latter by means of two clamps that surround the front end of the rod and which are fixed by two screws or two bolts inserted in the two holes of a selected pair of holes in the oscillating vertical plate. In prior art machines currently in service, one of the two clamps, to be more precise the one between the front end of the rod and the oscillating vertical plate, is made in the form of a reinforcing member that extends horizontally towards the rear over a part of the length of the rod and which curves outwards. At the rear, the chassis of the harvesting device includes two vertical legs and the second end (usually the rear end) of each shaker rod of each shaker assembly is connected to the chassis by a link that is articulated by a vertical pin to a yoke that is itself fixed against the inside face of one of the two vertical legs by means of two nut-and-bolt fasteners that pass through a selected pair of holes of a series of pairs of holes provided in said vertical leg.

Under the above conditions, each time that a shaker member must be taken out of service, it is necessary to unscrew four bolts (one pair of bolts at the front end and one pair of bolts at the rear end of the shaker member), to remove the two pairs of bolts from the two pairs of holes in which they were inserted in the oscillating vertical plate and in the vertical leg of the chassis, and to then extract the shaker member and the associated link from the machine completely and put them down on the field or remove them to some other place. Each time that a shaker member must be put into service, it is necessary to feed it with the associated link into the interior of the machine, then to position the front and rear ends of the shaker member at the required height, then to engage the two bolts of each of the two pairs of bolts in the respective two pairs of holes in the oscillating vertical plate and the vertical leg of the chassis that correspond to the required height for the shaker member, and finally to replace and tighten the four nuts on the four bolts. Similar operations are also effected each time that the height of a shaker member must be adjusted, except that in this case the shaker member does not need to be removed from the machine. As modifying the number of shaker members or adjusting their height generally involves at least one pair of shaker members, and usually several pairs of shaker members, it is obvious that the above operations are irksome and time-consuming.

SUMMARY OF INVENTION

A main object of the invention is therefore to provide a harvesting device of the type defined in the preamble but enabling quick and easy modification of the number of shaker members in use in the machine, without shaker members that are to be taken out of service or put into service having to be completely removed from the machine or fed into its interior.

A subsidiary object of the invention is to provide a harvesting device of the type indicated above enabling quick and easy modification of the height of each shaker member.

According to the invention, there is provide a harvesting device for a machine for harvesting fruits, berries and the like, growing on fruit trees or bushes planted in rows, the device including: a straddling chassis; two shaker assemblies mounted face-to-face on the chassis and that co-operate to shake the fruit trees or bushes passing between the two shaker assemblies to detach the fruits, berries or the like therefrom, each shaker assembly including: drive means including a vertical shaft oscillating about a vertical axis; a plurality of vertically spaced shaker members, each shaker member consisting of a flexible material rod that extends substantially horizontally and that has a curved shape, at least one rod having a first end detachably coupled to the drive means, a median part adapted to act on the fruit trees or bushes to shake them, and a second end connected to the chassis; characterised in that the first end of said at least one rod is mounted on the vertical shaft so that it can rotate relative to said vertical shaft and is coupled to the drive means so that, in the coupled state, said at least one rod assumes a working position in which the median part of the rod is relatively close to said median vertical plane of symmetry and is able to operate on the fruit trees or bushes, whereas, in the uncoupled state, said rod is able, because of said rotation relative to said vertical shaft, to assume an inactive rest position in which the median part of the rod is substantially farther away from the vertical median plane of symmetry than in the working position and is unable to operate on the fruit trees or bushes.

This structure is able to achieve the first object of the invention.

The harvesting device can additionally have one or more of the following features: the first end of each rod is associated with a mount consisting of two half-shells that surround the vertical shaft and are assembled together by at least one nut-and-bolt fastener and in that the first end of the rod is fixed to one half-shell by a build-in type connection, said mount enabling said relative rotation between the first end of the rod and the vertical shaft; anti-friction means are disposed between the vertical shaft and the two half-shells.

In one embodiment of the invention the oscillating vertical shaft has at least one series of coupling and drive lugs that are fixed rigidly to the oscillating vertical shaft at intervals along said shaft and project radially relative to it, and at least one of the two half-shells of the mount associated with the first end of each rod has a lateral portion adapted to be detachably fixed to one of the coupling and drive lugs of said series of lugs.

In another embodiment of the invention the drive means further include, for each shaker assembly, an oscillating vertical plate that extends parallel to the corresponding oscillating vertical shaft and is connected to it by at least two vertically spaced spacers and at least one of the two half-shells of the mount associated with the first end of each rod has a lateral portion adapted to be detachably fixed to said oscillating vertical plate.

In said other embodiment of the invention, the second object of the invention is achieved by virtue of the fact that, in said uncoupled state, the first end of each rod and the associated mount are adapted to slide together along the corresponding oscillating vertical shaft.

In said other embodiment of the invention the oscillating vertical plate can consist of a profiled plate having a portion that is oriented substantially radially relative to the vertical shaft and has a series of vertically spaced orifices along the oscillating vertical plate; in this case two nut-and-bolt fasteners are provided for assembling the two half-shells of the mount, the two nut-and-bolt fasteners being disposed on respective opposite sides of the vertical shaft, and in that the bolt of one of the two nut-and-bolt fasteners is disposed and dimensioned so that it can be inserted into an orifice selected from said series of orifices and is also used to attach said mount detachably to the oscillating vertical plate, the first end of the rod being detachably coupled to the oscillating vertical plate by means of said mount, said bolt and the associated nut;

There is a gap between the two half-shells of the mount on the same side as the nut-and-bolt fastener for detachably fixing the mount to the oscillating vertical plate so that, when said nut-and-bolt fastener is tightened, the two half-shells of the mount firmly clamp the vertical shaft;

In a variant of said other embodiment of the invention the oscillating vertical plate consists of a profiled plate having a first portion that is oriented substantially radially relative to the vertical shaft and a second portion that is perpendicular to the first portion and has a series of vertically spaced orifices along the oscillating vertical plate.

In said variant a first half-shell of the mount carries a latch that is mobile relative to the first half-shell between a first position in which an active portion of the latch is engaged in an orifice selected from said series of orifices and co-operates with an edge of the selected orifice to hold the mount attached to the oscillating vertical plate and a second position in which the latch is disengaged from said selected orifice and allows the oscillating vertical plate to rotate relative to the mount around the axis of the vertical shaft, and releasable immobilising means are provided for immobilising the latch at least in its first position, the first end of the latch being detachably coupled to the oscillating vertical plate by said mount and the latch in its first position.

The immobilising means or locking mechanism consist of a bolt whose shank is passed through an oblong opening formed in the latch and co-operates with a nut or a threaded hole in a lateral flange of the first half-shell to clamp and immobilise the latch between [sic] said lateral flange of the first half-shell.

The second half-shell has a lateral flange that faces the lateral flange of the first half-shell and is in contact with the first portion of the oscillating vertical plate when the latch is engaged in any of the orifices of said series of orifices.

There is a gap between the lateral flanges of the two half-shells and in that the lateral flange of the first half-shell includes a protuberance that is in linear contact with the latch between its active portion and the bolt, so that, when the active portion of the latch is engaged in the selected orifice and the bolt is tightened into the nut or the threaded hole, the latch tilts about the line of contact with the protuberance and acts in the manner of a lever, bearing against the edge of the selected orifice and against the protuberance, to press the lateral flange of the first half-shell towards the lateral flange of the second half-shell and to press the latter lateral flange against the first portion of the oscillating vertical plate so that the two half-shells clamp the vertical shaft firmly.

In either embodiment each shaker assembly is associated with a series of fixed supports that are vertically spaced on the chassis in the vicinity of the first ends of the rods forming the shaker members of the shaker assembly, each support being able to support of said rods when it is in its inactive rest position.

The first end of each rod is associated with a reinforcing member that is placed on the outside of the rod and clamped with the first end thereof onto one half-shell of the mount associated with the rod, each reinforcing member extending horizontally beyond said mount towards the second end of the rod, curving outwards and being able to co-operate with one of said fixed supports to support the associated rod when it is in its inactive rest position.

The chassis includes two vertical legs that are symmetrically disposed on either side of said vertical median plane of symmetry and each of which includes a vertical slot over the major part of the length of the corresponding leg, and in that each link of each shaker assembly is articulated by a vertical pin to a yoke that is fixed against the inside face of one of the two legs so that its height can be adjusted by means of a single bolt that is passed through the slot in the leg, a backing plate and a single nut that is screwed onto the bolt and which clamps the backing plate against the outside face of said leg.

The present invention also provides a harvesting machine including a harvesting device having one or more of the features mentioned above.

Other features and advantages of the invention will emerge during the course of the following description of two embodiments of the invention, given by way of example and with reference to the accompanying drawings, in which:

BRIEF DESCRIPTION OF THE DRAWINGS

The invention will now be described further, by way of example, with reference to the accompanying drawings, in that:

FIG. 5 is a plan view, partly in horizontal section, showing how the rear end of a shaker member is connected to a vertical leg of the chassis of the harvesting device;

DETAILED DESCRIPTION OF THE PREFERRED EMBODIMENT

Figure 1:
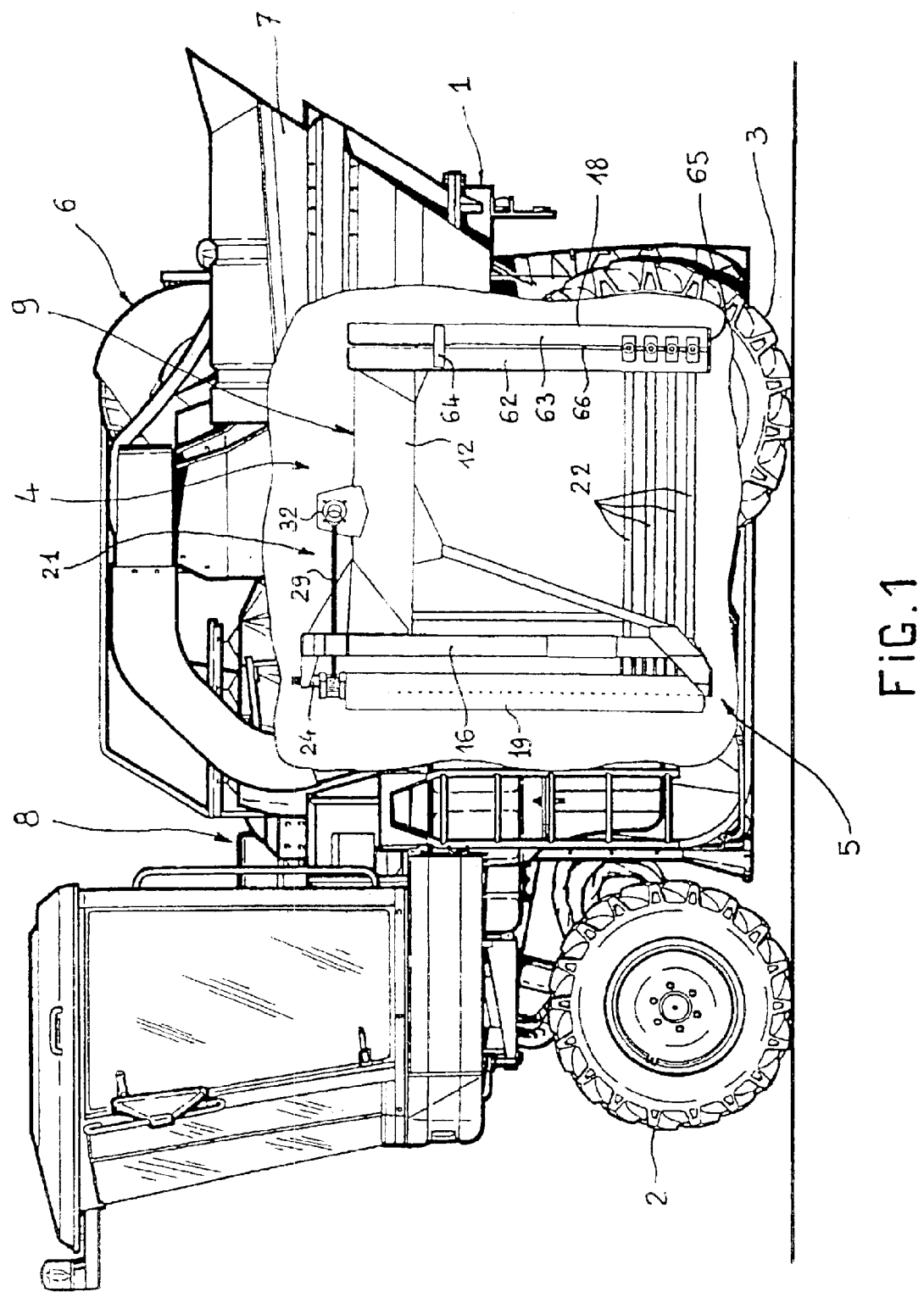
FIG. 1 is a vertical side view, partly cut away, showing a harvesting machine equipped with a harvesting device in accordance with one embodiment of the present invention.

The harvesting machine shown in FIG. 1 includes, as is known in the art, a chassis 1 equipped with front wheels 2 and rear wheels 3 to enable it to roll over the ground and which is in the shape of a gantry so that it can straddle at least one row of crops, for example a row of vines, or several rows of vines, for example two or three rows of vines if the machine is intended for use in close-planted vineyards. The chassis 1 carries, as is known in the art, a harvesting device 4 including two shaker assemblies 5 and two elevator conveyors 6 for collecting the grapes detached by the two shaker assemblies 5 and conveying them to at least one temporary storage hopper 7 (two hoppers are usually provided, one on each side of the machine), together with a motor 8 providing the power to drive the various active-members of the machine and also to drive its wheels if it is a self-propelled machine.

Figure 2:
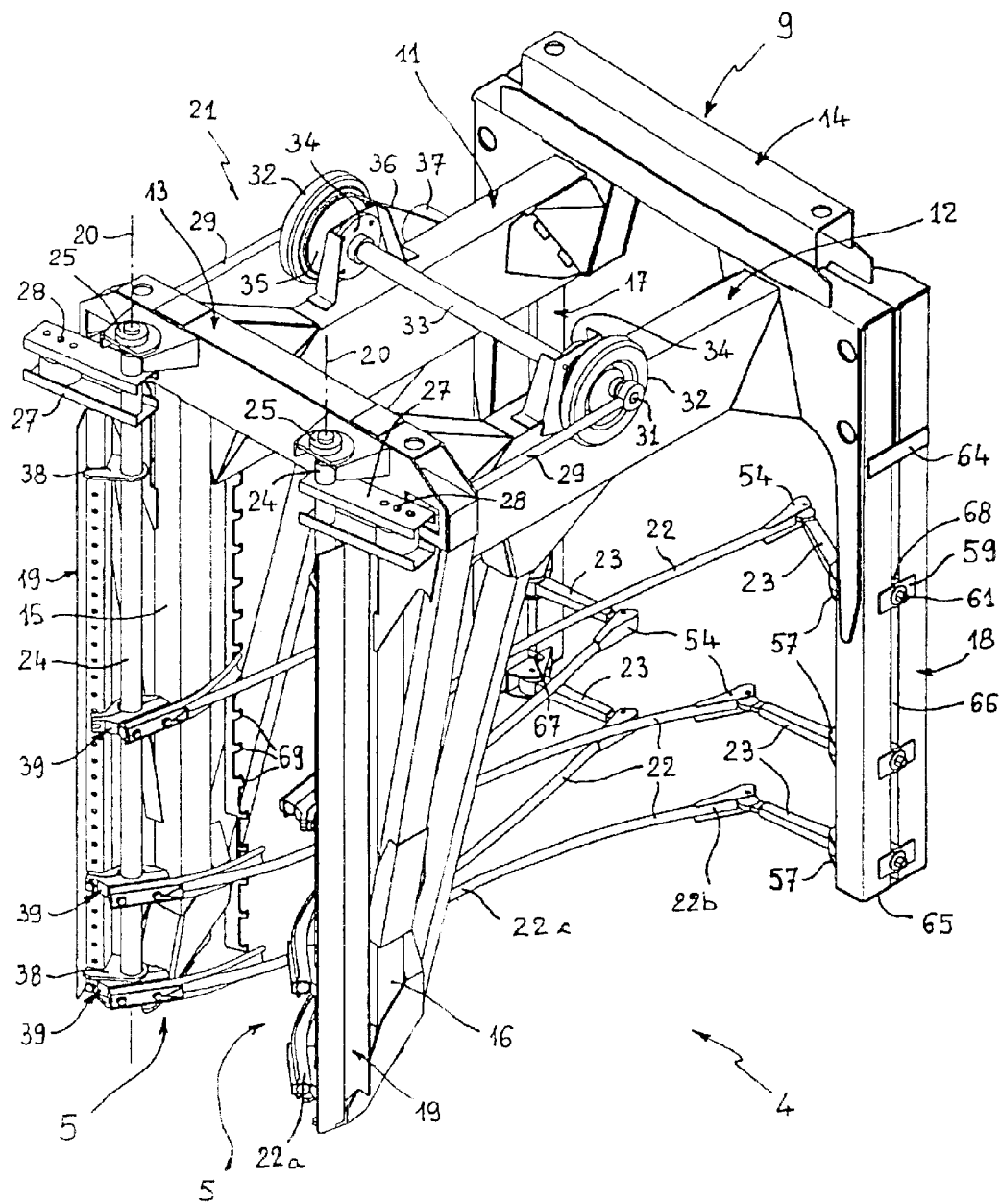
FIG. 2 is a perspective view to a larger scale, showing the essential components of the harvesting device of the machine shown in FIG. 1.

The harvesting device 4 can be fixed permanently to the chassis 1 of the machine or it can be made in the form of a removable assembly, detachably fixed to the chassis 1, so that it can be replaced by other equipment or accessories, such as spraying equipment, cutting equipment, soil working equipment, etc. Depending on circumstances, the harvesting device 4 can be supported directly by the chassis 1 of the machine or by an auxiliary chassis 9, which is also in the shape of a gantry and whose dimensions are such that it can straddle only one row of vines. As is known in the art, the auxiliary chassis 9 can be fixed relative to the chassis 1 or can be mounted in its upper part to swing pendulum-fashion about a horizontal and longitudinal axis. In FIG. 2, the two shaker assemblies 5 of the harvesting device 4 are mounted face-to-face on the auxiliary chassis 9 on respective opposite sides of the vertical median plane of symmetry of the chassis 9. As is known in the art, the chassis 9 is of welded construction and includes two longitudinal members 11 and 12, a front crossmember 13, a rear crossmember 14, two vertical front legs 15 and 16 and two vertical rear legs 17 and 18.

As is known in the art, each of the two shaker assemblies 5 includes an oscillating vertical plate 19 which, in use, oscillates about a vertical axis 20 under the control of a drive mechanism 21, and a plurality of vertically spaced shaker members 22. Each shaker assembly 5 can include four shaker members 22, for example, as shown in FIG. 1, or three shaker members, as shown in FIG. 2. Of course, each shaker assembly 5 could include a greater number of shaker members if required. As is known in the art, each shaker member 22 consists of a rod having a small cross section compared to its length and made from a flexible material such as a glass fibre-reinforced polyester resin or a polyamide, for example. In the case of vines, good results have been obtained with rods having a circular section of approximately 30 mm diameter and a length of approximately 1.8 m, made from type 6 polyamide, the modulus of elasticity E of which is equal to 3000 N/mm2. As is known in the art, each rod 22 can be solid or hollow (tubular), or it can have a composite structure with a core having the required flexibility characteristics covered with a wear material different from the material of the core. In a relaxed state, each rod 22 is substantially rectilinear. When it is mounted in the harvesting device 4, it extends horizontally lengthwise and curves or flexes into an arcuate shape, the convex side of which is oriented towards the vertical median plane of symmetry of the chassis 9. As described in detail later, the front end 22a of each rod 22 is detachably coupled to one of the two oscillating vertical plates 19 and the rear end 22b of each rod 22 is connected to the chassis 9, to be more precise to one of the two rear legs 17 and 18, by a link 23.

Figure 3:
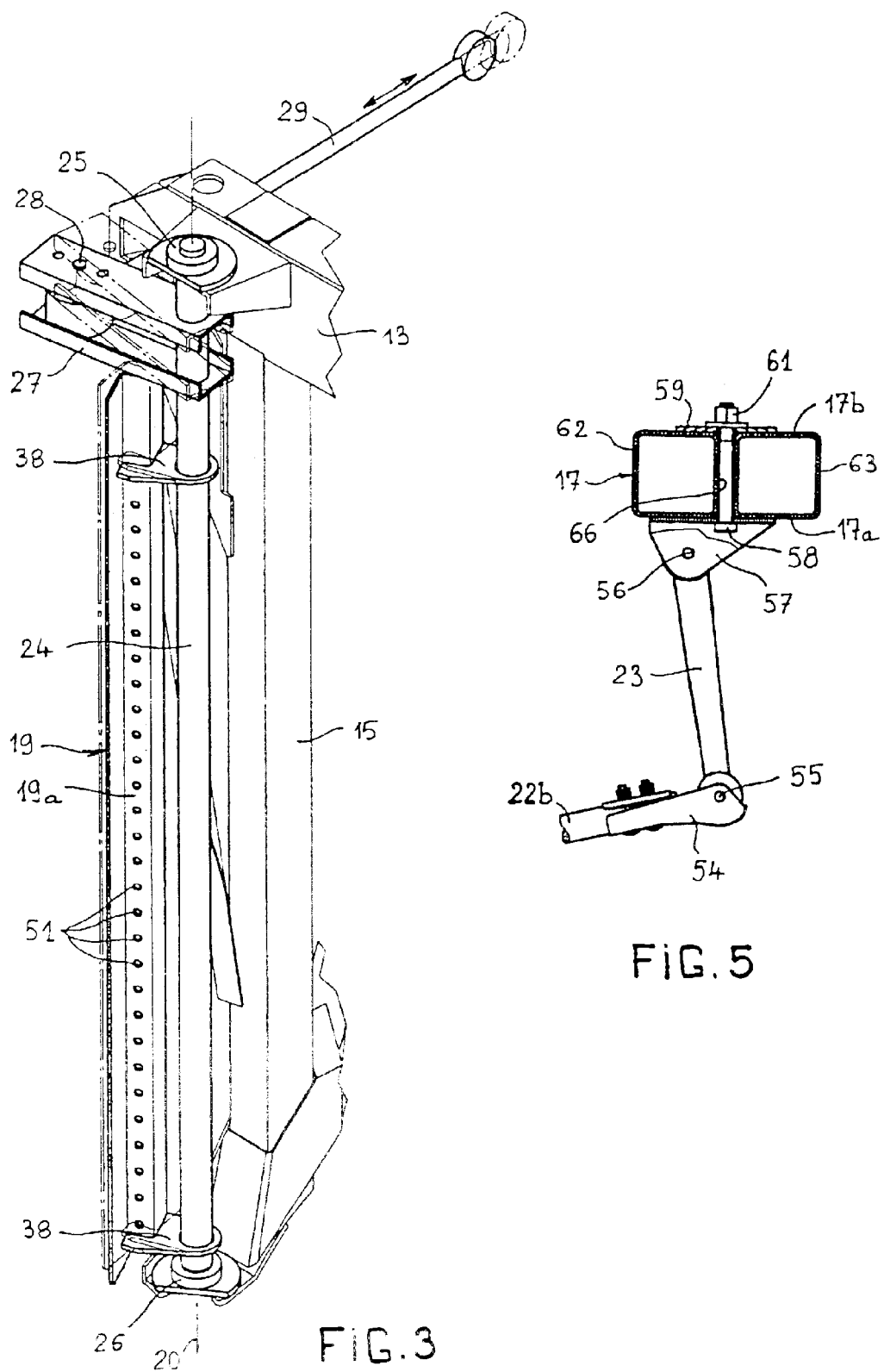
FIG. 3 is a perspective view to a larger scale than that of FIG. 2, showing the drive means associated with one of the two shaker assemblies of the harvesting device, the shaker members being omitted to clarify the diagram.

Each shaker assembly 5 includes a vertical shaft 24 that extends parallel to the oscillating vertical plate 19, as shown in FIGS. 2 and 3, and whose geometrical axis coincides with the vertical axis of oscillation 20 of said oscillating vertical plate. The shaft 24 of each shaker assembly 5 is rotatably mounted in two bearings 25 and 26 that are respectively installed on the front crossmember 13 and at the lower rear end of the front leg 15 or 16. One end of each shaft 24, preferably its upper end, is rigidly fixed to a radial drive arm 27 which is coupled to the drive mechanism 21. To be more precise, as shown in FIGS. 2 and 3, each drive arm 27 is articulated by a pin 28 to one end of a link 29 whose other end is articulated to a crank pin 31 of a cam 32. The lengths of the two links 29 are preferably adjustable. The two cams 32 are respectively fixed to the ends of a shaft 33 that is rotatably mounted in two bearings 34 respectively carried by the longitudinal members 11 and 12. A pulley or a sprocket 35 is also fixed to the shaft 33 and is connected by a transmission belt or an endless chain 36 to another pulley or sprocket (not shown) that can be driven in rotation by a motor 37, for example a hydraulic motor. Each oscillating vertical plate 19 is rigidly connected to the adjacent vertical shaft 24 by at least two spacer plates 38 (see FIGS. 2 and 3) that are welded to the plate 19 and to the shaft 24. Accordingly, when the motor 37 is running, each vertical plate 19 oscillates with the vertical shaft 24 about the corresponding to oscillation axis 20 as indicated by the double-headed arrow F in FIG. 4.

Figure 4:
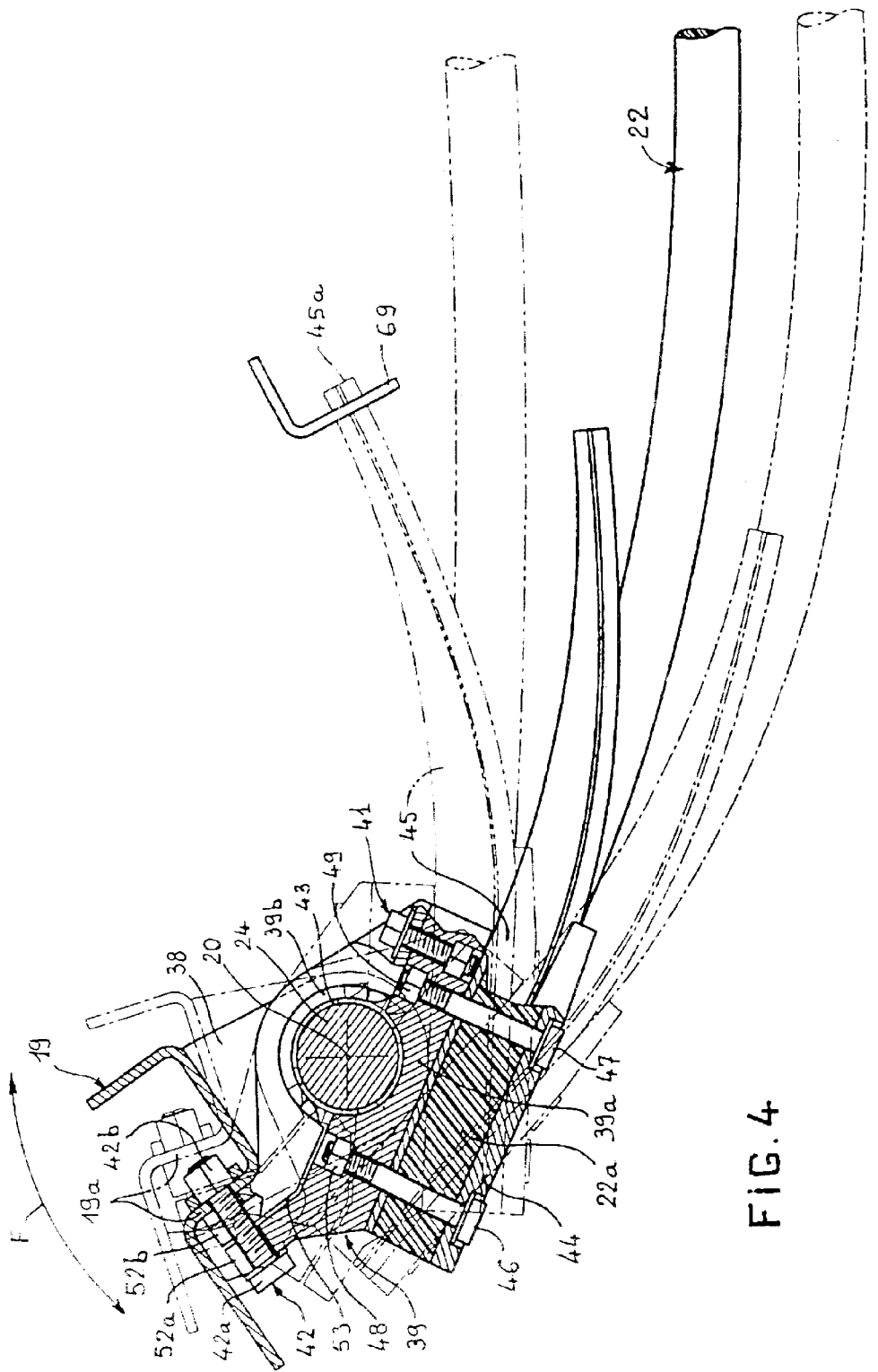
FIG. 4 is a plan view, partly in horizontal section, showing the front part of a shaker member and a first embodiment of the coupling means for coupling the shaker member to the oscillating vertical plate.

The front end 22a of each rod 22 is mounted on one of the two vertical shafts 24 so that it can rotate relative to said shaft and slide along it. To be more precise, as can be seen more clearly in FIG. 4, the front end 22a of each rod 22 is associated with a mount 39 consisting of two half-shells 39a and 39b that surround the vertical shaft 24 and are bolted together, for example by two nuts-and-bolt fasteners 41 and 42 in the embodiment shown in FIG. 4. Anti-friction means 43 are preferably disposed between the shaft 24 and the two half-shells 39a and 39b to facilitate relative rotation between the mount 39 and the shaft 24 and movement in translation of the mount along the shaft 24 when the nut-and-bolt fastener 42 is undone and removed. The front end 22a of the rod 22 is fixed to the half-shell 39a by a build-in type coupling. To be more precise, as shown in FIG. 4, the front end 22a of the rod 22 is placed between two clamping plates 44 and 45 that are fixed to the half-shell 39a by two bolts 46 and 47 passing through aligned holes in the plate 44, the front end 22a of the rod 22, the plate 45 and the half-shell 39a, and by two nuts 48 and 49 recessed into the half-shell 39a to prevent them from rotating. Two threaded holes could be provided in the half-shell 39a, instead of using the nuts 48 and 49.

Given that, in use, each rod 22 is subjected to strong alternating bending stresses in the region near its front end 22a when it is coupled to the oscillating vertical plate 19 and the latter is oscillating about the axis 20, and as is known in the art, the clamping plate 45 can comprise a channel-shaped reinforcing member that extends horizontally beyond the mount 39 towards the rear end of the rod 22 and curves outwards, as shown in FIG. 4. Instead of this, the clamping plate 45 could be formed in one piece with the half-shell 39a.

In a first embodiment of the present invention, the detachable coupling between the front end 22a of each rod 22 and the oscillating vertical plate 19 can be provided in the following manner. As can be seen in FIGS. 3 and 4 in particular, each oscillating vertical plate 19 consists of a profiled plate having a portion 19a that is oriented substantially radially relative to the vertical shaft 24 and which features a series of vertically spaced mounting holes or orifices 51 along the oscillating vertical plate 19. In this case, the bolt 42a of the nut-and-bolt fastener 42 has dimensions such that, and disposed on a lateral part 52a of the mount 39 such that, when the adjacent lateral portion 52b of the half-shell 39b is brought into contact with the portion 19a of the oscillating vertical plate 19, either causing the latter to pivot about the axis 20 or causing the mount 39 to pivot about the shaft 24, the bolt 42a of the nut-and-bolt fastener 42 can be inserted in any of the orifices 51 in the oscillating vertical plate 19. The orifice 51 into which said bolt is inserted is selected according to the required height for the rod 22. Thus the nut-and-bolt fastener 42 also detachably attaches the mount 39 to the oscillating vertical plate 19. In other words, the front end 22a of the rod 22 is detachably coupled to the oscillating vertical plate 19 by the mount 39 and the nut-and-bolt fastener 42.

As shown in FIG. 4, there is preferably a gap 53 between the two half-shells 39a and 39b of the mount 39 on the same side as the nut-and-bolt fastener 42. The width of the gap 53 is chosen so that, when the nut-and-bolt fastener 42 is tightened up, the two half-shells 39a and 39b can deform elastically to a sufficient degree for them to clamp the vertical shaft 24 firmly and thereby prevent any movement in rotation or longitudinal sliding between that shaft and the mount 39 when the latter is attached to the oscillating vertical plate 19.

As indicated above, the rear end 22b of each rod 22 of each shaker assembly 5 is connected to the rear leg 17 or 18 of the chassis 9 by means of a link 23. To this end, as shown in FIGS. 2 and 5, the rear end 22b of each rod 22 is fixed, for example bolted, to a yoke 54 that is articulated by a vertical pin 55 to one end of the link 23 associated with the rod 22. The other end of the link 23 is articulated by another vertical pin 56 to a yoke 57 which is fixed against the inside face 17a of the rear leg 17 (or against the inside face of the rear leg 18) by means of a single bolt 58, which passes through the leg 17 or 18, and by means of a backing plate 59 and a nut 61 that is screwed onto the bolt 58 and that clamps the plate 59 against the outside face 17b of the leg 17 (or against the outside face of the leg 18). To enable continuous adjustment of the height of the yoke 57 along the inside face 17a of the leg 17 (or the inside face of the leg 18), each of the two legs 17 and 18 preferably consists of two square or rectangular cross-section tubular members 62 and 63. The two tubular members 62 and 63 are connected together by a plurality of spacer plates such as the spacer plates 64 and 65 shown in FIGS. 1 and 2, which are welded to the two members 62 and 63. The two members 62 and 63 are spaced from each other so that a slot 66 is defined between them whose width is slightly greater than the diameter of the shank of the bolts 58 that fix the yokes 57 to the leg 17 or 18.

To prevent the yokes 57 and the backing plates 59 turning about the axis of the bolts 58 when the nuts 61 are tightened, each yoke 57 and each plate 59 has a finger 67 or 68 (see FIGS. 2 and 6A) engaged in the slot 66.

With the embodiment described above, the height of each shaker member or rod 22 can be adjusted in the following manner. The nut 42b of the nut-and-bolt fastener 42 of the mount 39 associated with the rod 22 whose height is to be adjusted is unscrewed and the corresponding bolt 42a is removed from the orifice 51 in which it was inserted. The mount 39 is then slid up or down along the vertical shaft 24 until the front end 22a of the rod 22 reaches the required height. The bolt 42a is then inserted in another orifice 51 in the oscillating vertical plate 19 corresponding to the new height chosen for the front end 22a of the rod 22 and the nut 42b is replaced and screwed onto the bolt 42a, after which the bolt and/or the nut are tightened until the lateral part 52b of the half-shell 39b is pressed firmly against the part 19a of the oscillating vertical plate 19 and the two half-shells 39a and 39b clamp the vertical shaft 24 firmly. The nut 61 corresponding to the rod 22 whose height is being adjusted is then loosened sufficiently for the yoke 57, the bolt 58 and the backing plate 59 to be able to slide along the slot 66 of the leg 17 or 18 of the chassis 9. The yoke 57 is then moved vertically up or down to bring the rear end 22b of the rod 22 to the required height, after which the nut 61 is tightened to lock the yoke 57 in its new position against the inside face of the leg 17 or 18.

It can therefore be seen that to adjust the height of any shaker member or rod 22 it is sufficient to slacken off only two nuts 42b and 61, only one of which (42b) has to be removed from the corresponding bolt. The adjustment is therefore much simpler and faster than in the prior art machine described above. Also, the risk of losing a bolt or a nut during adjustments is reduced.

Figure 6A:
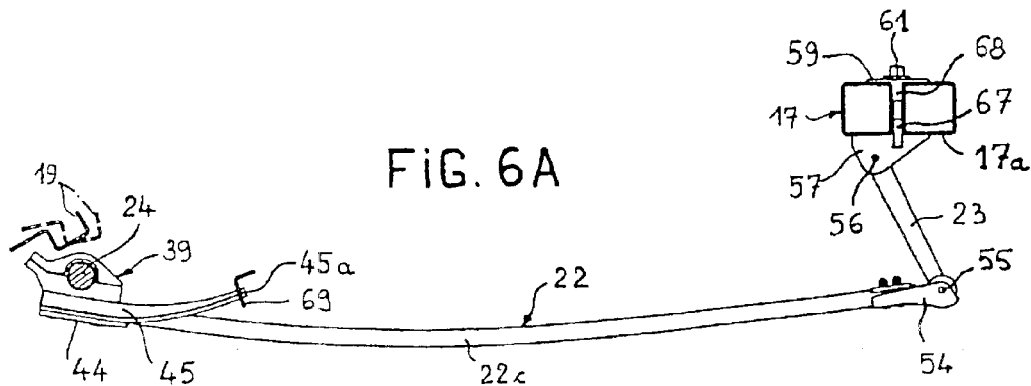
FIGS. 6A to 6C are plan views showing three respective different states of a shaker member when the harvesting device is in use, FIG. 6A showing the shaker member in an inactive rest position with its front end decoupled from the oscillating vertical plate, and FIGS. 6B and 6C showing the shaker member in two working positions respectively corresponding to the two limiting angular positions of the oscillatory movement of the oscillating vertical plate.
Figure 6B:
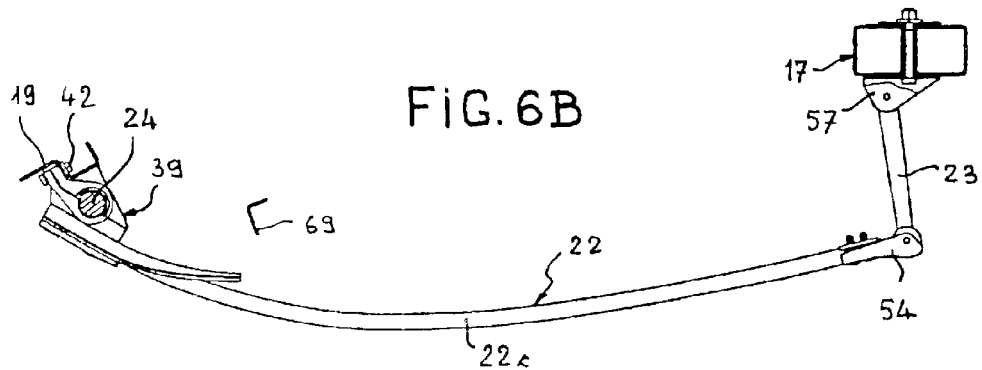
Figure 6C:
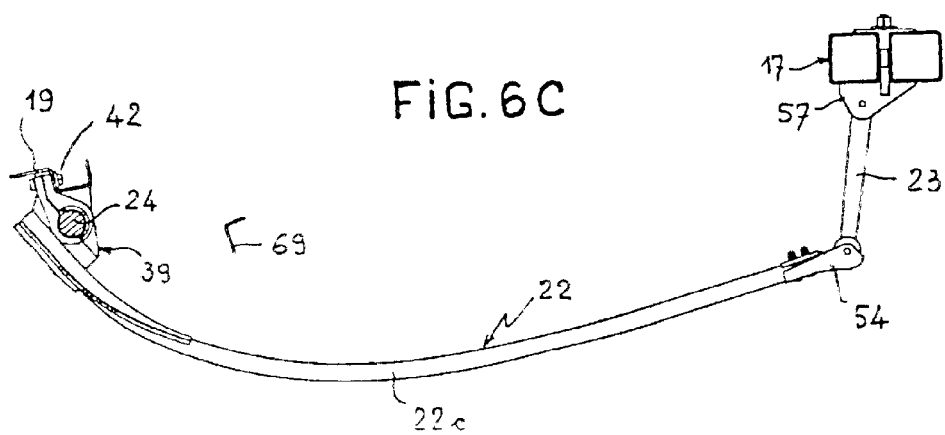

When the mount 39 of any of the rods 22 is attached to the corresponding oscillating vertical plate 19 by the nut-and-bolt fastener 42, the rod 22 assumes a curved shape whose convex side is oriented towards the vertical median plane of symmetry of the chassis 9, as shown in the lower part of FIG. 2 and in FIGS. 6B and 6C. In use, the curvature of each rod 22 varies as a function of the angular position of the oscillating vertical plate 19 during its oscillatory movement. FIGS. 6B and 6C respectively show minimum and maximum curvatures of a rod 22 corresponding to the two limiting angular positions of the oscillatory movement of the oscillating vertical plate 19. Under these conditions, the median part 22c of the rod 22 is relatively close to the vertical median plane of symmetry and can operate on the vines of one row of vines to shake them, in co-operation with at least one other rod 22 coupled to the other oscillating vertical plate 19, as the machine moves forward along the row of vines and the two oscillating vertical plates 19 are caused to oscillate about their respective oscillation axis 20 by the drive mechanism 21.

On the other hand, if the nut-and-bolt fastener 42 associated with any of the mounts 39 is removed, because of its inherent elasticity, the corresponding rod 22 assumes a substantially rectilinear shape, as shown in the middle part of FIG. 2 and in FIG. 6A. In this state, the median part 22c of the rod 22 is substantially farther away from the vertical median plane of symmetry than in the working configuration in which the mount 39 is coupled to the oscillating vertical plate 19. Also, when the nut-and-bolt fastener 42 is removed, the two half-shells 39a and 39b of the mount 39 no longer clamp the vertical shaft 24 firmly, and the shaft can therefore turn freely in the mount 39 without transmitting any torque to it or to the corresponding rod 22. When any of the rods 22 is in the state shown in FIG. 6A, it is therefore in an inactive rest position in which its median part 22c is unable to act on the vines of a row of vines passing between the two shaker assemblies 5.

Each shaker assembly 5 is associated with a series of fixed supports 69 (see FIG. 2) that are spaced vertically on the chassis near the front ends of the rods 22. The two series of supports 69 are respectively disposed along the front legs 15 and 16 of the chassis 9, for example, so that each support 69 is able to support a rod 22 when it is in its inactive rest position. To be more precise, each support 69 takes the form of a hook that is adapted to receive the rear end 45a of the reinforcing member 45 of a rod 22 when the latter is in its inactive rest position, as shown in continuous line in FIG. 6A and in chain-dotted line in FIG. 4.

Accordingly, if the number of shaker members or rods 22 of the machine must be modified in use, as a function of the height of the vines to be harvested, it is no longer necessary to remove completely from the machine or to add to the machine one or more pairs of rods 22 and the associated links 23. It is sufficient for the harvesting device 4 of the machine to be permanently equipped with a number of pairs of shaker members or rods 22 equal to the maximum number of pairs of rods that can be used, and to couple a greater or lesser number of mounts 39 to the oscillating vertical plates 19, as a function of the number of pairs of rods 22 required, the remaining, unused rods 22 being simply retained in their inactive rest position, as shown in FIG. 6A. For example, to remove or add one pair of rods 22, it is therefore sufficient to manipulate two nut-and-bolt fasteners 42 to uncouple the corresponding two mounts 39 from the corresponding two oscillating vertical plates 19 or to couple the mounts to said plates, as required.

Figure 7:
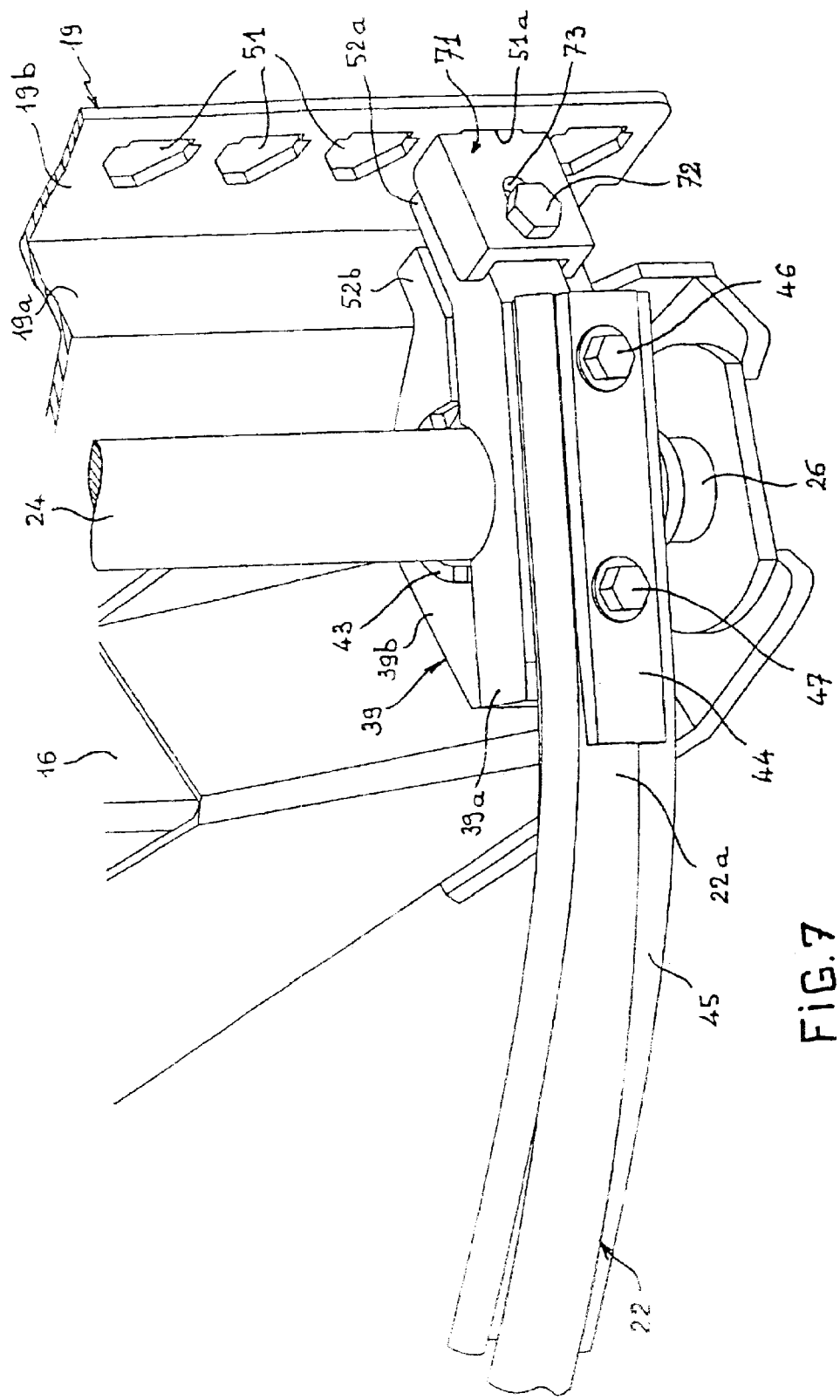
FIG. 7 is a partial perspective view showing a second embodiment of the coupling means for coupling a shaker member to the oscillating vertical plate.

FIGS. 7 and 8 show another embodiment of the coupling means for coupling each shaker member of each shaker assembly to the corresponding oscillating vertical plates. In the embodiment shown in FIGS. 7 and 8, components which are identical to or have the same function as those of the first embodiment described above are identified by the same reference numbers and are not described in detail again. In the embodiment shown in FIGS. 7 and 8, the oscillating vertical plate 19 of each shaker assembly consists of a profiled plate having a first part 19a that is oriented substantially radially relative to the vertical shaft 24 and a second part 19b that is perpendicular to the first part 19a. Here the orifices 51 of the series of vertically spaced orifices in each oscillating plate 19 are not formed in the part 19a of each oscillating vertical plate 19, but instead in the part 19b. Also, the half-shell 39a of each mount 39 carries a mobile latch 71 whose active part 71a can be engaged in an orifice selected from said series of orifices 51 to co-operate with an edge 51a of the selected orifice to hold the mount 39 attached to the oscillating vertical plate 19, as shown in FIGS. 7 and 8A. Releasable immobilising means are provided for immobilising the latch 71 at least in its latching position.

To be more precise, the immobilising means can consist of a bolt 72 whose shank passes through an oblong opening 73 formed in the latch 71 and cooperates with a nut 74 recessed into the lateral flange 52a of the half-shell 39a to clamp and immobilise the latch 71 against said lateral flange 52a. A threaded hole can be provided in the lateral flange 52a, instead of using the nut 74.

Figure 8A:
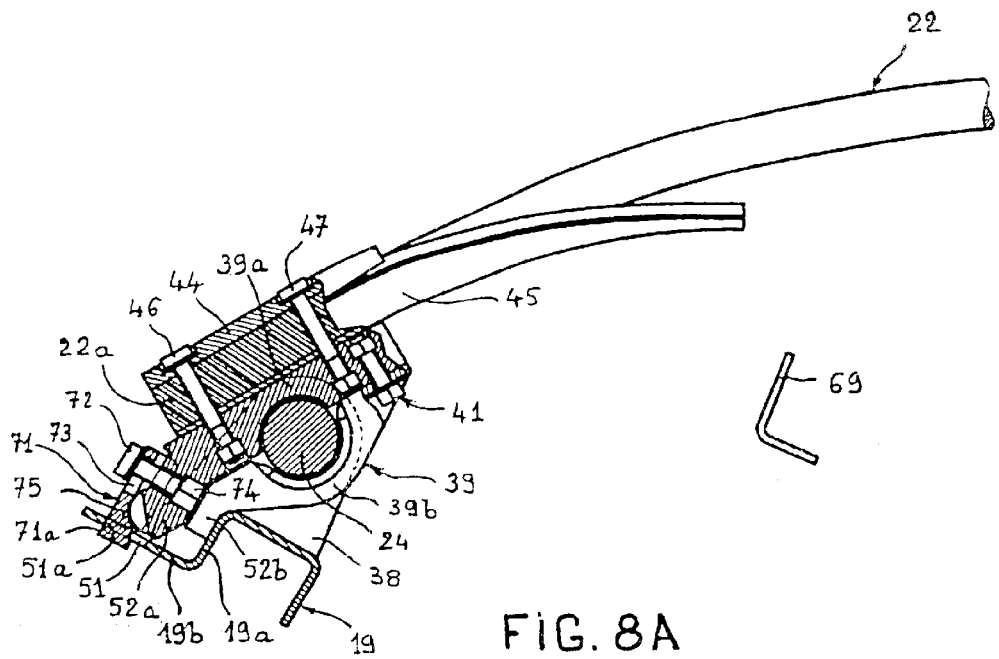
FIGS. 8A to 8D are plan views, partly in horizontal section, corresponding to the second embodiment shown in FIG. 7 and showing successive states of the coupling means during uncoupling of a shaker member from the oscillating vertical plate.

There is preferably a gap 53 (see FIG. 8D) between the two lateral flanges 52a and 52b of the two half-shells 39a and 39b, as in the first embodiment. Also, the lateral flange 52a incorporates a protuberance 75 that is in linear contact with the latch 71, between its active part 71a and the bolt 72. Accordingly, when the active parts 71a of the latch 71 is engaged in the selected orifice 51 and the bolt 72 is tightened down in the nut 74, the latch 71 turns about the line of contact with the protuberance 75 and operates like a lever, bearing on the edge 51a of the selected orifice 51 and on the protuberance 75 to press the lateral flange 52a towards the lateral flange 52b and to press the latter flange against the part 19a of the oscillating vertical plate 19. As a result of this the two half-shells 39a and 39b then clamp the vertical shaft 24 and, at the same time, the mount 39 is coupled by the latch 71 to the oscillating vertical plate 19, as shown in FIG. 8A.

Figure 8B:
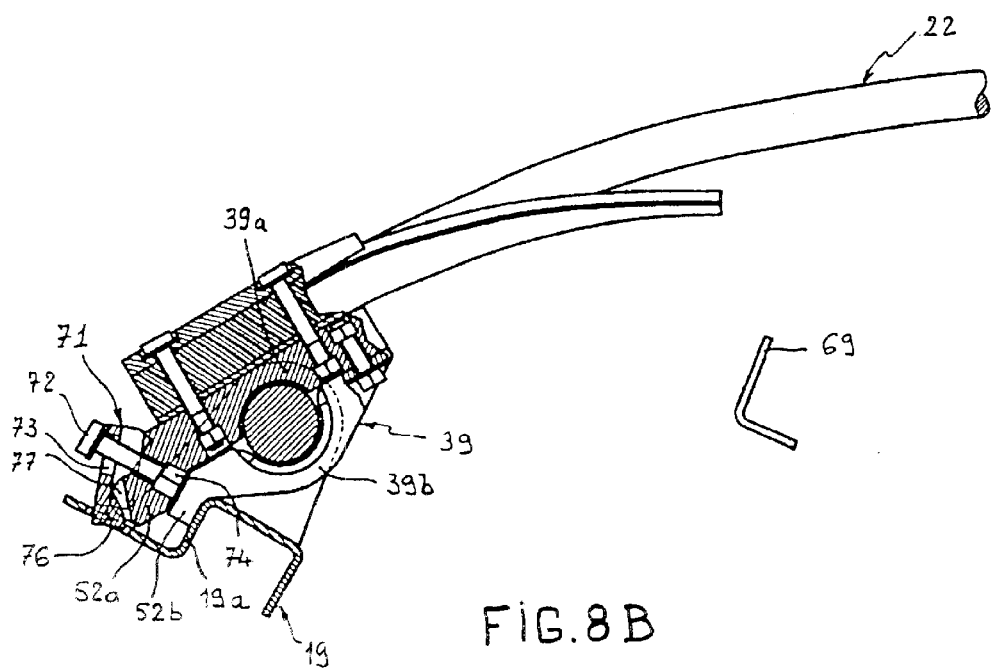
Figure 8C:
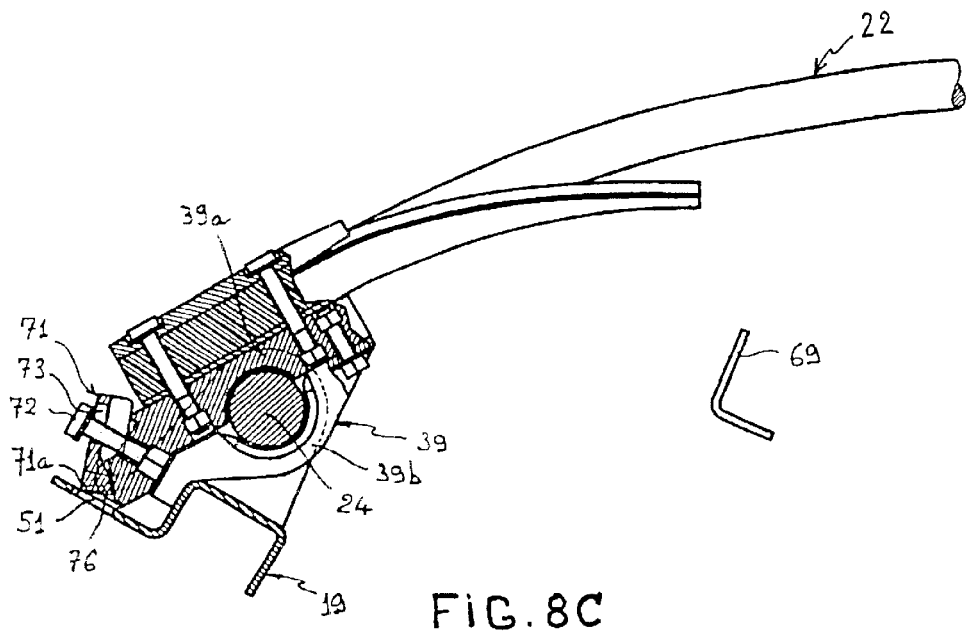
Figure 8D:
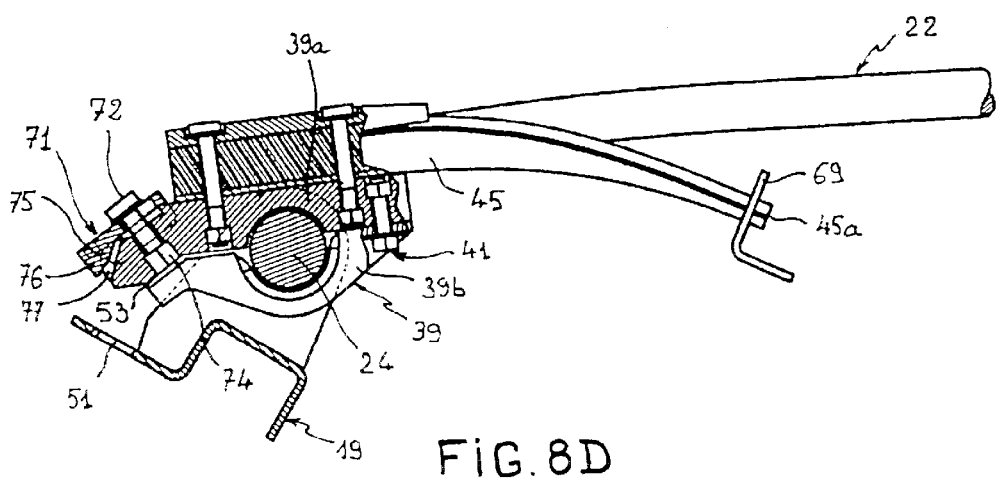

To uncouple the mount 39 from the oscillating vertical plate 19, for example to place the rod 22 in its inactive rest position or to adjust the height of its front end 22a, it is sufficient to loosen the bolt 72 without removing it completely from the nut 74, as shown in FIG. 8B. The active part 71a of the latch 71 can then be withdrawn from the orifice 51 by sliding said latch away from the portion 19b of the oscillating vertical plate 19, as shown in FIG. 8C. The sliding movement of the latch 71 is guided, on the one hand, by the shank of the bolt 72 and by the opening 73, and, on the other hand, by a substantially triangular projection 76 on the latch 71 that can slide in a slot 77 in the protuberance 75. As soon as the active part 71a of the latch 71 has left the orifice 51, because of its inherent elasticity, the rod 22 assumes its natural and substantially rectilinear shape. If the rod 22 must be left in an inactive rest position, its reinforcing member 45 is hooked into one of the hook-shaped supports 69, as shown in FIG. 8D. The bolt 72 can then be screwed back into the nut 74 to immobilise the latch 71 in its unlatched position. Note that, in the state shown in FIG. 8D, the half-shells 39a and 39b of the mount 39 are held together only by the nut-and-bolt fastener 42, as a result of which the shaft 24 can turn freely in the mount 39.

If the height of the front end of the rod 22 must be modified, it is then sufficient, starting from the state shown in FIG. 8C, to slide the mount 39 along the shaft 24 until the front end of the rod 22 reaches the required position, and then to slide the latch 71 so that its active portion 71a engages in another orifice 51 corresponding to said required position. Finally, the bolt 72 is again tightened in the nut 74 to lock the latch 71 in its latching position, as shown in FIG. 8A.

Figure 9:
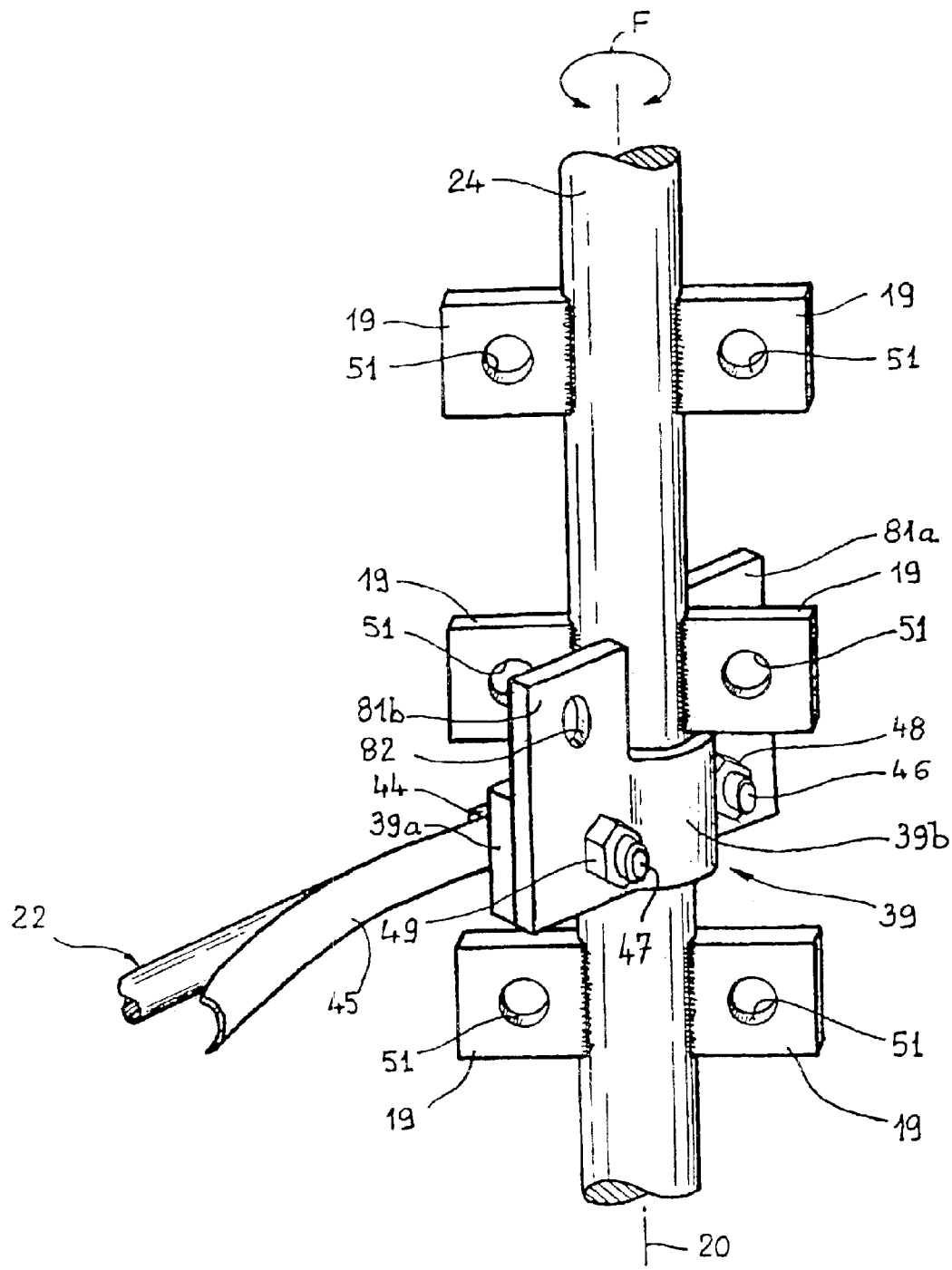
FIG. 9 is a partial perspective view showing another embodiment of the drive means associated with one of the two shaker assemblies, one shaker member being shown only partially to simplify the diagram.
Figure 10A:
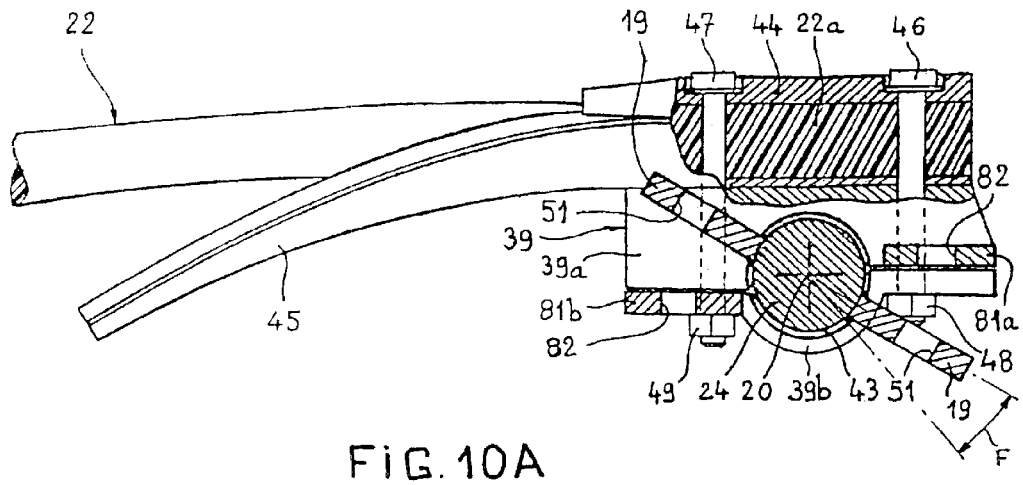
FIG. 10A is a plan view, partly in horizontal section, showing the front part of a shaker member in the uncoupled state and the coupling means for coupling the shaker member to the oscillating vertical shaft.
Figure 10B:
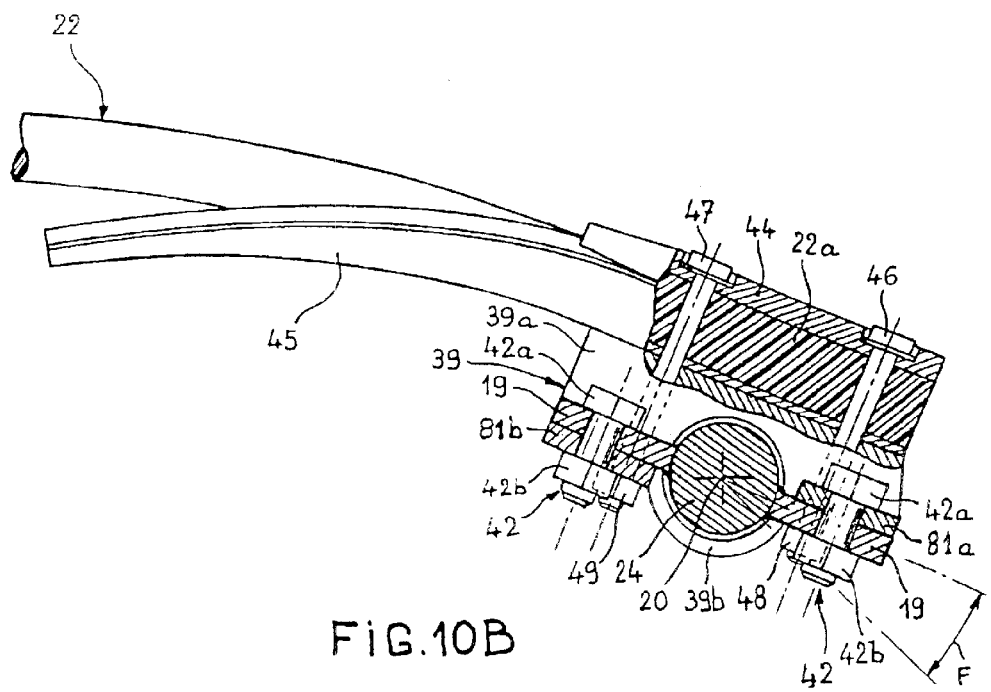
FIG. 10B is a view similar to FIG. 10A showing the shaker member in the coupled state.

FIGS. 9, 10A and 10B show another embodiment of the drive means and the coupling means for coupling the front end of each shaker member to the oscillating vertical shaft of the corresponding shaker assembly. In the embodiment of FIGS. 9, 10A and 10B, components that are identical to or have the same function as those of the previous embodiments are identified by the same reference numbers and are not described in detail again.

In the embodiment of FIGS. 9, 10A and 10B, the oscillating vertical plate 19 of the embodiments described above is replaced by at least one series of coupling and drive lugs 19 that are rigidly fixed, for example welded, to the oscillating vertical shaft 24 at intervals along it, and that project radially relative to it. When there are two series of lugs 19, as shown, each lug 19 of one series is aligned with a lug 19 of the other series and all the lugs 19 of both series are in a plane passing through the axis 20 of the shaft 24. The number of lugs 19 in each series of lugs is at least equal to the maximum number of shaker members 22 of a shaker assembly, and is preferably much greater than that maximum number to provide a wide variety of choice for the height of the shaker members. Each lug 19 includes an orifice 51 adapted to a receive a bolt 42a of the nut-and-bolt fastener 42 (see FIG. 10B) enabling the mount 39 associated with the front end 22a of a shaker member 22 to be coupled detachably to the lug 19 or to two corresponding lugs 19 corresponding to the required height of the shaker member 22.

The mount 39 for mounting the front end 22a of each shaker member 22 rotatably on the oscillating vertical shaft 24 here also consists of two half-shells 39a and 39b, preferably with an anti-friction pad 43. In the embodiments shown in FIGS. 9, 10A and 10B, the nut-and-bolt fasteners 46, 48 and 47, 49 for fixing the front end 22a of the shaker member and the two flanges 44 and 45 to the half-shell 39a are also used to fix the two half-shells 39a and 39b together. However, if required, the two half-shells could be fixed together by nut-and-bolt fasteners other than the two fasteners 46, 48 and 47, 49.

At least one of the two half-shells 39a and 39b of each mount 39, for example both half-shells, has respective lateral parts 81a and 81b through which there is a hole 82 and each of which can be detachably fixed by a respective nut-and-bolt fastener 42 to a pair of lugs 19 on the oscillating vertical shaft 24 to couple the corresponding shaker member 22 to said shaft, as shown in FIG. 10B.

In the uncoupled state shown in FIGS. 9 and 10A, the shaft 24 can oscillate without entraining the drive member 22, which remains in an inactive position, in which it can be held by a hook-shaped support similar to the supports 69 shown in FIG. 2. In the coupled state shown in FIG. 10B, the shaft 24 can entrain the shaker member 22 which is therefore active and can operate on the vines to be harvested.

It can therefore be seen that, once again, each shaker member 22 can be put into service or taken out of service quickly and easily, simply by fitting or removing two nut-and-bolt fasteners 42 (or a single nut-and-bolt fastener 42 if the shaft 24 has only one series of lugs 19), without having to feed the shaker member into the machine or to remove it completely therefrom.

It goes without saying that the embodiments of the invention described above are provided by way of non-limiting and purely illustrative example, and that many modifications can be made by the skilled person without departing from the scope of the invention. Thus, although the invention has been described with reference to a harvesting machine whose shaker members are of curved arcuate shape, the invention is also applicable to harvesting machines whose shaker members have a curved shape other than an arcuate shape, for example a hairpin shape. Also, in the embodiment shown in FIGS. 9, 10A and 10B, instead of being in a vertical plane passing through the axis 20 of the shaft 24, the lugs 19 could be in horizontal planes perpendicular to the axis 20, and the lateral portion or portions 81a and 81b could be bent at a right-angle so as also to be in horizontal planes. In this case, the bolts 42a of the nut-and-bolt fasteners 42 would be parallel to the axis 20.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A harvesting device for a machine for harvesting fruits, berries and the like, growing on fruit trees or bushes planted in rows, the device including:
   a) a straddling chassis;
   b) two shaker assemblies mounted face-to-face on the chassis and that co-operate to shake the fruit trees or bushes passing between the two shaker assemblies to detach the fruits, berries or the like therefrom, each shaker assembly including:
      i) drive mechanism including a vertical shaft oscillating about a vertical axis;

ii) a plurality of vertically spaced shaker members, each shaker member consisting of a flexible material rod that extends substantially horizontally and that has a curved shape, at least one rod having a first end closest to the drive mechanism, the first end of the at least one rod detachably coupled to the drive mechanism, a median part adapted to act on the fruit trees or bushes to shake them, and a second end connected to the chassis;

characterised in that the first end of said at least one rod is mounted on the vertical shaft so that it can rotate relative to said vertical shaft and is coupled to the drive mechanism so that, in a coupled state, said at least one rod assumes a working position in which the median part of the rod is relatively close to a median vertical plane of symmetry and is able to operate on the fruit trees or bushes, whereas, in an uncoupled state, said rod is able, because of said rotation relative to said vertical shaft, to assume an inactive rest position in which the median part of the rod is substantially farther away from the vertical median plane of symmetry of the chassis than in the working position and is unable to operate on the fruit trees or bushes.

2. A harvesting device according to claim 1, further characterised in that:

the first end of said rod is associated with a mount consisting of two half-shells that surround the vertical shaft and are connected together by at least one mechanical fastener; and the first end of the rod is affixed to one half-shell by an enveloping type connection, said mount enabling said relative rotation between the first end of the rod and the vertical shaft.

3. A harvesting device according to claim 2, further characterised in that each shaker assembly is associated with a series of fixed supports that are vertically spaced on the chassis in the vicinity of the first ends of the rods constituting the shaker members of the shaker assembly, each support being able to support one of said rods when the latter is in its inactive rest position.

4. A harvesting device according to claim 3, further characterised in that the first end of said rod is associated with a reinforcing member that is placed on the outside of the rod and clamped with the first end thereof onto one half-shell of the mount associated with the rod, each reinforcing member extending horizontally beyond said mount towards the second end of the rod, curving outwards and being able to co-operate with one of said fixed supports to support the associated rod when it is in its inactive rest position.

5. A harvesting device according to claim 1, further characterised in that:

the chassis includes two vertical legs that are disposed on either side of a vertical median plane of symmetry and each of which includes a vertical slot over the major part of the length of the corresponding leg; and a link of at least one shaker assembly is articulated by a vertical pin to a yoke that is fixed against the inside face of one of the two legs so that its height can be adjusted by means of a single bolt means that is passed through the slot in the leg, a backing plate and a single nut that is screwed onto the bolt and which clamps the backing plate against the outside face of said leg.

6. A harvesting device according to claim 4, further characterised in that:

the chassis includes two vertical legs that are disposed on either side of a vertical median plane of symmetry and each of which includes a vertical slot over the major part of the length of the corresponding leg; and a link of at least one shaker assembly is articulated by a vertical pin to a yoke that is fixed against the inside face of one of the two legs so that its height can be adjusted by means of a single bolt means that is passed through the slot in the leg, a backing plate and a single nut that is screwed onto the bolt and which clamps the backing plate against the outside face of said leg.

7. A harvesting device for a machine for harvesting fruits, berries and the like, growing on fruit trees or bushes planted in rows, the device including:

a) a straddling chassis;

b) two shaker assemblies mounted face-to-face on the chassis and that co-operate to shake the fruit trees or bushes passing between the two shaker assemblies to detach the fruits, berries or the like therefrom, each shaker assembly including:

i) drive mechanism including a vertical shaft oscillating about a vertical axis;

ii) a plurality of vertically spaced shaker members, each shaker member consisting of a flexible material rod that extends substantially horizontally and that has a curved shape, at least one rod having a first end detachably coupled to the drive means, a median part adapted to act on the fruit trees or bushes to shake them, and a second end connected to the chassis;

characterised in that the first end of said at least one rod is mounted on the vertical shaft so that it can rotate relative to said vertical shaft and is coupled to the drive mechanism so that, in the coupled state, said at least one rod assumes a working position in which the median part of the rod is relatively close to a median vertical plane of symmetry and is able to operate on the fruit trees or bushes, whereas, in the uncoupled state, said rod is able, because of said rotation relative to said vertical shaft, to assume an inactive rest position in which the median part of the rod is substantially farther away from the vertical median Diane of symmetry of the chassis than in the working position and is unable to operate on the fruit trees or bushes, further characterised in that the first end of said rod is associated with a mount consisting of two half-shells that surround the vertical shaft and are connected together by at least one mechanical fastener; and the first end of the rod is affixed to one half-shell by an enveloping type connection, said mount enabling said relative rotation between the first end of the rod and the vertical shaft, further characterised in that an anti-friction mechanism is disposed between the vertical shaft and the two half-shells.

8. A harvesting device according to claim 7, further characterised in that, in said uncoupled state, the first end of said rod and the associated mount are adapted to slide together along the corresponding oscillating vertical shaft.

9. A harvesting device according to claim 8, further characterised in that the oscillating vertical shaft is provided with at least one series of coupling and drive lugs that are fixed rigidly to the oscillating vertical shaft at intervals along said shaft and project radially relative to it, and at least one of the two half-shells of the mount associated with the first end of said rod has a lateral portion adapted to be detachably fixed to one of the coupling and drive lugs of said series of lugs.

10. A harvesting device according to claim 8, further characterised in that the drive mechanism further include, for each shaker assembly an oscillating vertical plate that extends parallel to the corresponding oscillating vertical shaft and is connected to it by at least two vertically spaced spacers and at least one of the two half-shells of the mount associated with the first end of said rod has a lateral portion adapted to be detachably fixed to said oscillating vertical plate.

11. A harvesting device according to claim 10, further characterised in that the oscillating vertical plate consists of a profiled plate having a portion that is oriented substantially radially relative to the vertical shaft and has a series of vertically spaced orifices along the oscillating vertical plate.

12. A harvesting device according to claim 11, further characterised in that two mechanical fasteners are provided for assembling the two half-shells of the mount, said two mechanical fasteners being disposed on respective opposite sides of the vertical shaft, and in that the bolt of one of the two mechanical fasteners is disposed and dimensioned so that it can be inserted into an orifice selected from said series of orifices and is also used to attach said mount detachably to the oscillating vertical plate, the first end of the rod being detachably coupled to the oscillating vertical plate by means of said mount, said bolt and the associated nut.

13. A harvesting device according to claim 12, further characterised in that there is a gap between the two half-shells of the mount on the same side as the mechanical fastener for detachably fixing the mount to the oscillating vertical plate so that, when said mechanical fastener is tightened, the two half-shells of the mount firmly clamp the vertical shaft.

14. A harvesting device according to claim 10, further characterised in that the oscillating vertical plate consists of a profiled plate having a first portion that is oriented substantially radially relative to the vertical shaft and a second portion that is perpendicular to the first portion and has a series of vertically spaced orifices along the oscillating vertical plate.

15. A harvesting device according to claim 14, further characterised in that:
   a first half-shell of the mount carries a latch that is mobile relative to the first half-shell between a first position in which an active portion of the latch is engaged in an orifice selected from said series of orifices and co-operates with an edge of the selected orifice to hold the mount attached to the oscillating vertical plate, and a second position in which the latch is disengaged from said selected orifice and allows the oscillating vertical plate to rotate relative to the mount around the axis of the vertical shaft; and
   releasable locking mechanism are provided for immobilising the latch at least in its first position, the first end of the latch being detachably attached to the oscillating vertical plate by said mount and the latch in its first position.

16. A harvesting device according to claim 15, further characterised in that the locking mechanism consist of a bolt whose shank is passed through an oblong opening formed in the latch and co-operates with a nut or a threaded hole in a lateral flange of the first half-shell to clamp and immobilise the latch to and against said lateral flange of the first half-shell.

17. A harvesting device according to claim 16, further characterised in that the second half-shell has a lateral flange that faces the lateral flange of the first half-shell and is in contact with the first portion of the oscillating vertical plate when the latch is engaged in any of the orifices of said series of orifices, wherein said locking mechanism is a bolt.

18. A harvesting device according to claim 17, further characterised in that there is a gap between the lateral flanges of the two half-shells and in that the lateral flange of the first half-shell includes a protuberance that is in linear contact with the latch between its active portion and said bolt, so that, when the active portion of the latch is engaged in the selected orifice and the bolt is tightened into the nut or the threaded hole, the latch tilts about the line of contact with the protuberance and acts in the manner of a lever, bearing against the edge of the selected orifice and against the protuberance, to press the lateral flange of the first half-shell towards the lateral flange of the second half-shell and to press the latter lateral flange against the first portion of the oscillating vertical plate so that the two half-shells clamp the vertical shaft firmly.

19. A harvesting device according to claim 18, further characterised in that each shaker assembly is associated with a series of fixed supports that are vertically spaced on the chassis in the vicinity of the first ends of the rods constituting the shaker members of the shaker assembly, each support being able to support one of said rods when the latter is in its inactive rest position.

20. A harvesting device according to claim 19, further characterised in that the first end of said rod is associated with a reinforcing member that is placed on the outside of the rod and clamped with the first end thereof onto one half-shell of the mount associated with the rod, each reinforcing member extending horizontally beyond said mount towards the second end of the rod, curving outwards and being able to co-operate with one of said fixed supports to support the associated rod when it is in its inactive rest position.

21. A harvesting device for harvesting fruit, berries, or the like from bushes or trees, the device comprising a shaker assembly configured to shake fruit trees or bushes to detach the fruits, berries, or the like, the shaker assembly comprising:
   i) a drive mechanism;
   ii) a vertical shaft;
   iii) a plurality of vertically spaced flexible rods, each of the plurality of flexible rods having a first end closest to the drive mechanism and a second end and a median part therebetween adapted to engage the fruit trees or bushes;
   wherein at least one of the plurality of flexible rods is rotatably mounted to the vertical shaft and coupled to the drive mechanism such that the drive mechanism moves the flexible rod about the vertical shaft to shake the trees or bushes in harvesting fruit, berries or the like,
   wherein each flexible rod includes an uncoupled state such that the first end closest to the drive mechanism is uncoupled from the drive mechanism and rotatable about the vertical shaft such that the median part of the flexible rod is inoperative to harvest fruit, berries or the like from the trees or bushes.

22. A method of harvesting fruit, berries, or the like from bushes or trees, the method comprising the steps of:
   providing a first and second shaker assembly configured face-to-face with respect to the other, the first and second shaker assemblies each having a drive mechanism, a vertical shaft, and a plurality of vertically spaced flexible rods, each of the plurality of flexible rods having a first end closest to the drive mechanism and a second end and a median part therebetween adapted to engage the fruit trees or bushes;
   moving the flexible rods with the drive mechanism about the vertical shaft such that the median part of the at least one flexible rod oscillates to shake the trees or bushes,
   uncoupling at least one of the plurality of flexible rods from the drive mechanism such that the first end of the flexible rod closest to the drive mechanism is free to rotate about the vertical shaft and is inoperative to harvest fruit, berries or the like from the trees or bushes.

* * * * *